United States Patent
Bürgel (10) Patent No.: US 9,248,969 B2
(45) Date of Patent: Feb. 2, 2016

(54) TRAY ASSEMBLY FOR BALANCING WEIGHTS

(71) Applicant: Wegmann automotive GmbH & Co. KG, Veitshöchheim (DE)

(72) Inventor: Hans-Ulrich Bürgel, Roden (DE)

(73) Assignee: WEGMANN AUTOMOTIVE GMBH & CO. KG, Veitshochheim (DE)

( * ) Notice: Subject to any disclaimer, the term of this patent is extended or adjusted under 35 U.S.C. 154(b) by 0 days.

(21) Appl. No.: 14/488,411

(22) Filed: Sep. 17, 2014

(65) Prior Publication Data
US 2015/0001046 A1    Jan. 1, 2015

Related U.S. Application Data

(63) Continuation of application No. PCT/EP2013/055781, filed on Mar. 20, 2013.

(30) Foreign Application Priority Data

| Mar. 20, 2012 | (EP) | 12160445 |
| Jul. 13, 2012 | (EP) | 12176442 |

(51) Int. Cl.
*B65G 29/00*    (2006.01)
*B65G 17/12*    (2006.01)
(Continued)

(52) U.S. Cl.
CPC .............. *B65G 17/12* (2013.01); *F16F 15/324* (2013.01); *G01M 1/326* (2013.01)

(58) Field of Classification Search
CPC .. B65G 59/067; B65G 2201/02; B65G 17/32; B65G 2201/0258; F16F 15/324

USPC ............ 198/867.11, 803.14; 73/660; 221/29, 221/79, 105, 188; 414/801

See application file for complete search history.

(56) References Cited

U.S. PATENT DOCUMENTS

| 2007/0068259 A1 | 3/2007 | Douglas ......................... 73/662 |
| 2014/0374431 A1* | 12/2014 | Burgel et al. ..................... 221/1 |
| 2015/0010380 A1* | 1/2015 | Burgel ....................... 414/797.5 |

FOREIGN PATENT DOCUMENTS

| DE | 24 11 077 | 11/1975 |
| DE | 79 20 660 | 12/1979 |

(Continued)

OTHER PUBLICATIONS

International Search Report and Written Opinion in International Application No. PCT/EP2013/055781 dated Jun. 28, 2013.

(Continued)

*Primary Examiner* — James R Bidwell
(74) *Attorney, Agent, or Firm* — Norton Rose Fulbright US LLP (57) ABSTRACT

A tray assembly for balancing weights is disclosed. The tray assembly has trays of different sizes adapted to different sizes of the balancing weights. This results in that the balancing weights are all positioned in the same height, and therefore can easily be picked up by a handling system. The size of the tray may automatically be adjusted by slides operated by actuators. The tray may be a horizontal rotating tray assembly which preferably has a conical form, thus allowing a plurality of handling systems, picking up balancing weights at the same time. This results in a significantly improved loading speed.

26 Claims, 8 Drawing Sheets

(51) Int. Cl.
*F16F 15/32* (2006.01)
*G01M 1/32* (2006.01)

(56) References Cited

FOREIGN PATENT DOCUMENTS

DE 33 16 945 11/1984
GB 911 275 11/1962

OTHER PUBLICATIONS

International Preliminary Report on Patentability in International Application No. PCT/EP2013/055781 dated Sep. 23, 2014.
Extended European Search Report in European Application No. 12176442.7 dated Jan. 25, 2013.

* cited by examiner

TRAY ASSEMBLY FOR BALANCING WEIGHTS

PRIORITY CLAIM

This application is a continuation of pending International Application No. PCT/EP2013/055781 filed on Mar. 20, 2013, which designates the United States and claims priority from (1) European Application No. 12176442.7 filed on Jul. 13, 2012, and (2) European Application No. 12160445.8 filed on Mar. 20, 2012, all of which are incorporated by reference in their entireties.

BACKGROUND OF THE INVENTION

1. Field of the Invention

The invention relates to methods and devices for dispensing weights used in vehicle ballasting applications, in particular for dispensing weights used in balancing automobile or other vehicle wheels.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This has the drawback that a solid balancing weight is significantly more robust and reliable than these continuous tapes.

SUMMARY OF THE INVENTION

The embodiments are based on the object of providing selected balancing weights to be picked up by a handling device at predetermined positions, independent of the size of the balancing weight.

In an embodiment, a tray assembly for balancing weights is provided. This tray assembly allows a handling device, like an industrial robot, to pick up individual balancing weights, which previously may have been selected and/or delivered by a dispenser. Furthermore, the tray assembly has means to position the individual balancing weights within a tray such that they are in a reproducible position, independent of the size of the balancing weights. Most preferably the at least one picking element of the balancing weights is at the same height. Picking elements may be any parts of the balancing weights, which may be used for picking a balancing weight by a handling system. Such picking elements may be holes, preferably the pair of standard picking holes or clamps or any other part. The term height refers to the height above a reference plane, which may be defined by the base of the tray assembly.

There are various balancing weights on the market, whereas some of these balancing weights have holes by which they may be held by a handling system. To simplify the interface to handling system, it is preferred that these holes always are located at the same position, independent of the balancing weight's size.

A preferred embodiment of a tray assembly has different trays with different sizes, for holding balancing weights of different sizes. Each tray is adapted to a specific type of balancing weights, which results in a constant position of the holes, independent of the individual balancing weight. Instead of placing the holes at a constant position, other parts of balancing weights, like a clamp, may also be placed at a constant position. Preferably, the tray assembly has a balancing weight loading section, which may be connected to a dispenser or a belt conveyer delivering balancing weights. The loading section may be a chute through which the balancing weights are delivered. Preferably, trays are moveable against the loading section to select the appropriate tray for each balancing weight, which is received, by the loading section. In a first embodiment, the selection of the tray may be controlled by a common controller, which also controls a dispenser delivering the balancing weight. The controller has the information, which balancing weight is to be delivered by the dispenser, and therefore can select the appropriate tray. If there is no common controller, a sensor may be in front of the trays, which may for example be connected to the loading section, for detecting the size of the balancing weight. According to the detected balancing weight size, the tray may be selected. In a further embodiment, there may be a ledge, which prevents a balancing weight from entering into the trays for the case the trays are in movement, or not in the final position, or the tray is still occupied by a balancing weight. To identify whether a tray is empty or occupied by a balancing weight, an occupancy sensor may be provided. This may be an optical, magnetic, or any other sensor.

The trays may be arranged in a linear assembly, or in an arch-shaped or a ring-shaped assembly. A ring-shaped assembly has the advantage that movement is only required into one direction, while a linear assembly must be moved forward and backward. It is further preferred, if a ring-shaped assembly has a conical shape to allow the balancing weight to be positioned on a slanted surface, thereby holding a stable position. In a further embodiment, the trays are adaptable to the required size. This may be done by a slide, which may be controlled by an actuator via a push rod. This slide may be set to its correct position to limit the size of the tray, as soon as the size of the incoming balancing weight is known. In another embodiment, there may be a hole sensor or a sensor detecting any feature of a balancing weight for determining the size location of this feature. The slide may now be moved until the desired preferably of the balancing weight within the tray is reached. This may for example be the position, where the hole sensor detects a hole of the balancing weight.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
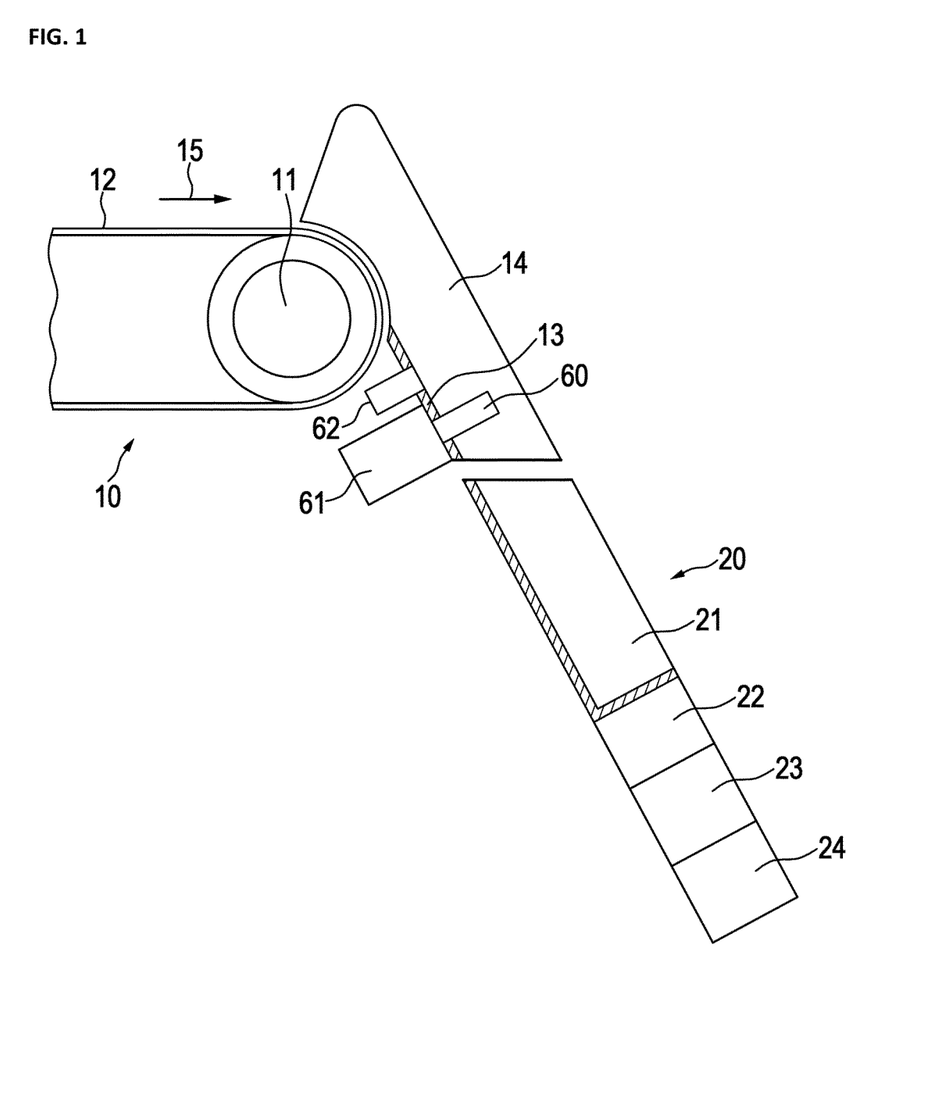
FIG. 1 shows a tray assembly for balancing weights.

In FIG. 1, a tray assembly for balancing weights is shown. Here, the tray assembly 20 is shown in a sectional view through a first tray 21. The other trays 22, 23, 24 having different sizes are arranged behind this tray. Furthermore, a loading section 10 is shown. This loading section may comprise a belt conveyer having a belt 12 driven by a conveyer pulley 11. The belt moves into direction 15, transporting balancing weights towards the tray assembly. For picking up the balancing weights from the belt 12, a chute 13 is provided. Sidewalls 14 prevent the balancing weights from falling of the chute. From the chute, the balancing weights may slide directly into a tray of the tray assembly below the slide. Furthermore, there may be a ledge 60 for preventing balancing weights to slide into the tray assembly for case the desired tray is not in a correct position, or the desired tray is still occupied by a balancing weight. This ledge may be operated by an actuator 61. Furthermore, a sensor 62 may be provided for detecting the presence of a balancing weight. Furthermore, there may be a sensor for detecting the size or type of balancing weights. This may be the same sensor as sensor 62 for the presence of a balancing weight. Although it is preferred that the loading section comprises a belt conveyer, this is not necessary. Instead, the balancing weights may slide directly by means of chute 13 into the tray assembly. Accordingly, the tray assembly may be coupled by means of a chute to a dispenser.

Figure 2:
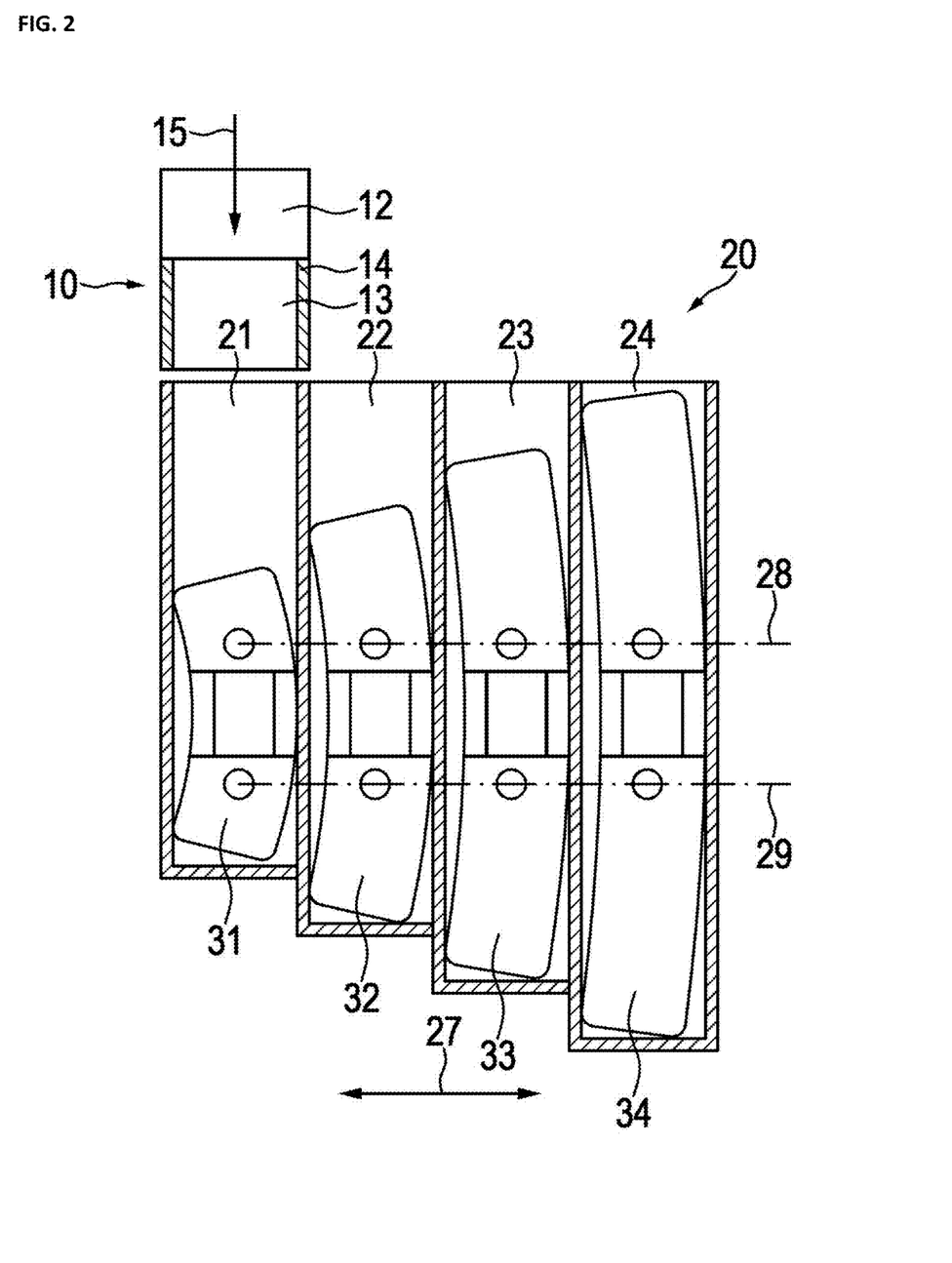
FIG. 2 shows a front view of a tray assembly.

In FIG. 2, a front view of the tray assembly is shown. There are exemplarily shown four different sizes of trays 21, 22, 23, 24. Each tray is loaded with a balancing weight 31, 32, 33, 34. The trays are adapted to the individual balancing weight types in such a way that the height (or position) of holes 28 and 29 is the same for all balancing weights. This allows for very simple picking-up of the balancing weights by a handling device, as the handling device only has to know the position of the holes, and therefore can pick the balancing weights always from the same location. Furthermore, the loading section 10 is shown, comprising a conveyer belt 12 moving into direction 15, and transporting the balancing weights via chute 13 towards the tray assembly 20. Tray assembly 20 may be moved as shown by arrow 27 in a linear movement under the loading section, so that each of the trays 21 to 24 may be loaded.

Figure 3:
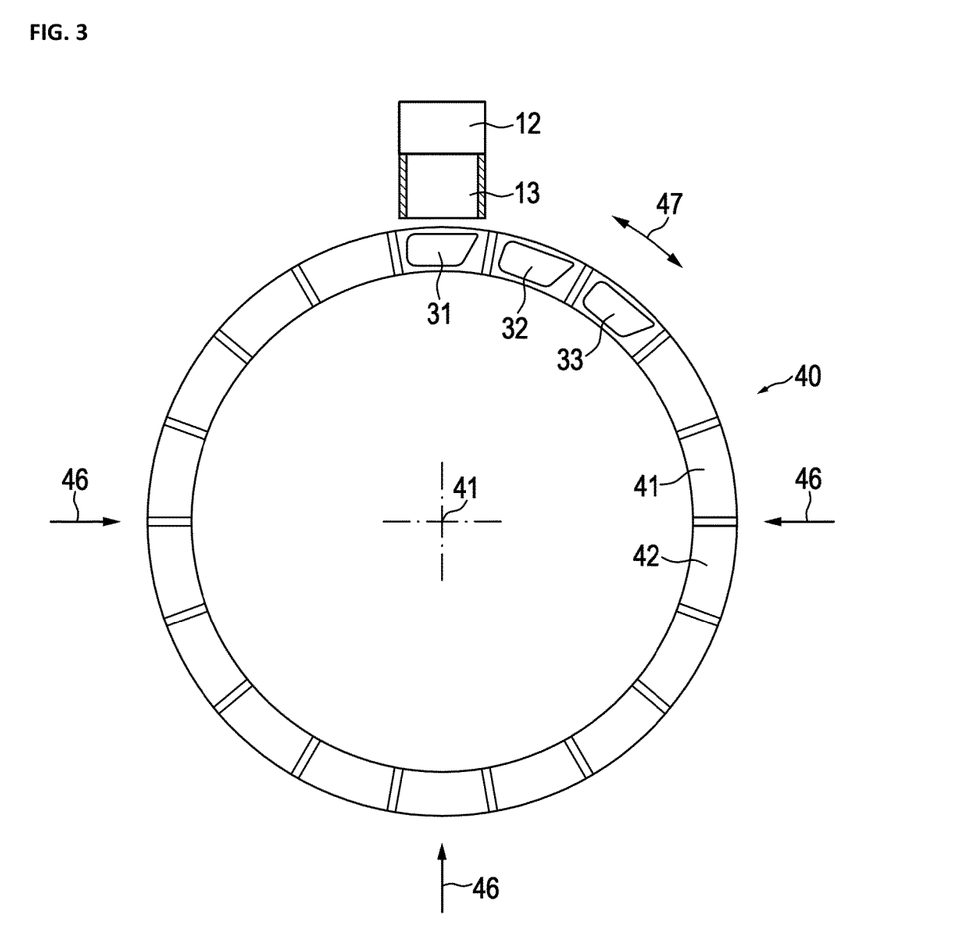
FIG. 3 shows a horizontal rotating tray assembly.

In FIG. 3, a horizontal rotating tray assembly 40 is shown. Basically, this may have a similar design as the linear tray assembly shown in the previous figures. The main difference is a circular arrangement, which allows for rotation in directions 47. It furthermore allows access by handling devices from a plurality of directions 46, which may even access the tray assembly at the same time. This allows for a significant improvement in loading speed. During time periods, where the handling devices are mounting the balancing weights to the rims, the trays may be loaded with new balancing weights.

Figure 4:
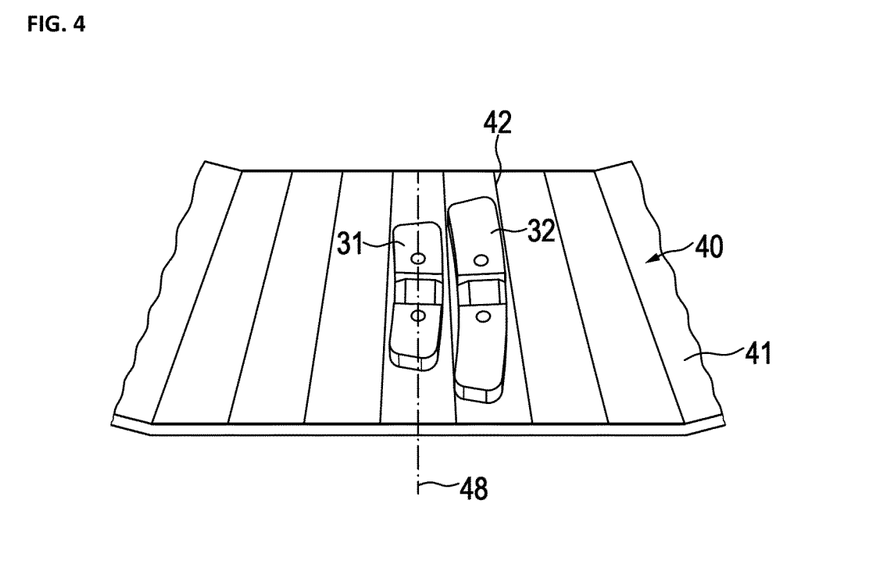
FIG. 4 shows a conical tray.

In FIG. 4, a horizontal rotating tray assembly 40 is shown which has a conical shape. Due to the conical shape, the balancing weights lie on a slanted surface, and therefore may take a stable position. Here, the balancing weight easily can be accessed from a plurality of handling systems at the same time.

Figure 5:
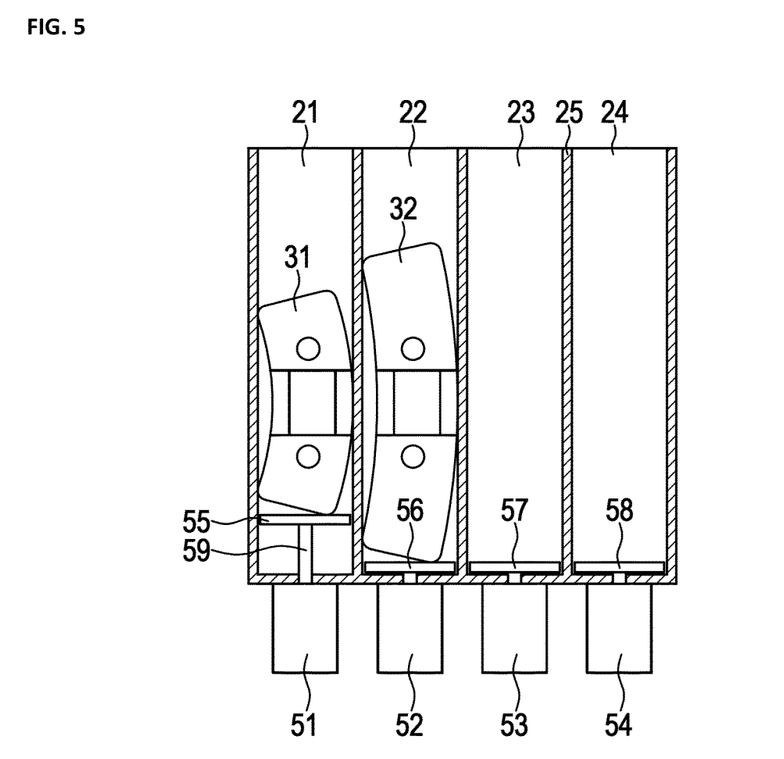
FIG. 5 shows a tray with slides.

In FIG. 5, a tray assembly with slides for adapting the trays to the size of individual balancing weights is shown. Here, the trays 21 to 24 have slides 55 to 58 at the bottom sides for adapting the length of the trays to the balancing weights 31, 32. The slides are operated by actuators 51 to 54, which may push the slides upwards by push rods 59. In a further embodiment, there may be screws or other means for manually adjusting the slides instead of driving the slides by actuators. This will simplify the system and reduce costs while maintaining some flexibility.

Figure 6:
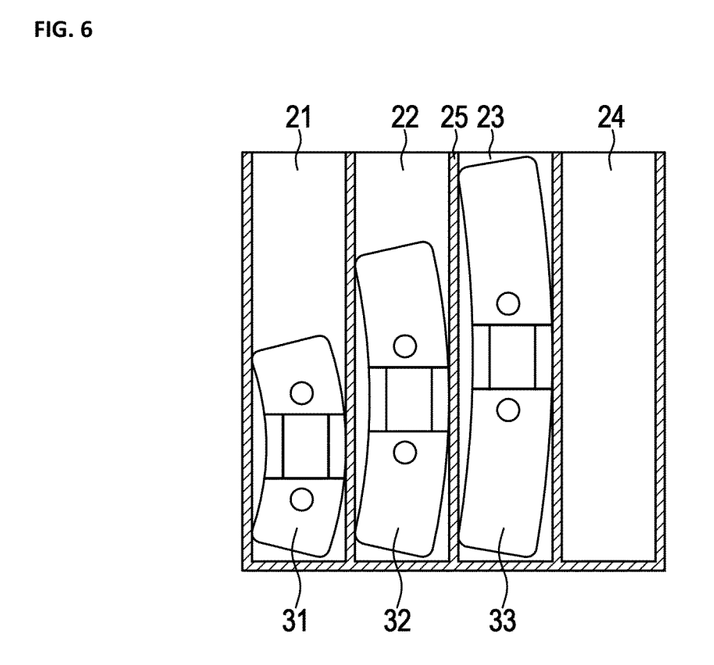
FIG. 6 shows a tray assembly with constant-sized trays.

FIG. 6 shows a tray assembly having trays of the same size 21 to 24 with differently sized balancing weights 31 to 33, resulting in different heights of the holes.

Figure 7:
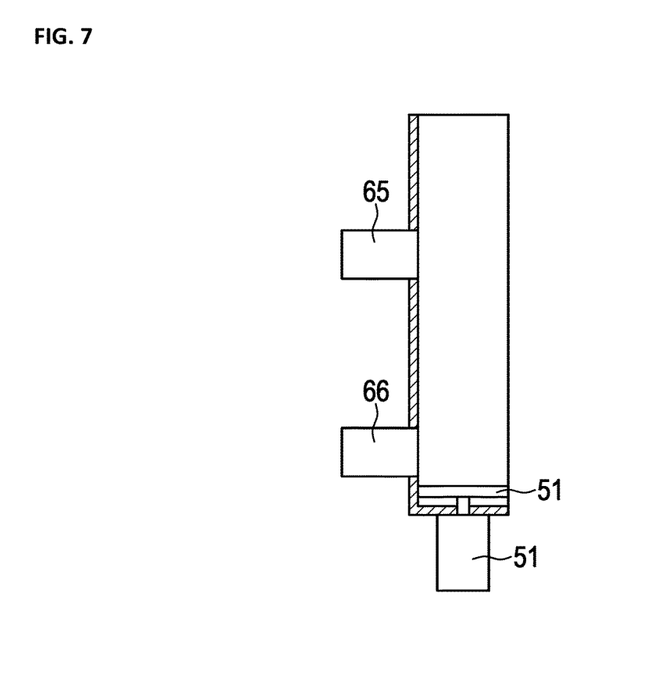
FIG. 7 shows a tray with slide and sensors.

In FIG. 7, a side view of a tray with slide 55 is shown. The slide may be operated by an actuator 51. Furthermore, an occupancy sensor is provided for detecting, whether a balancing weight is in the tray. Furthermore, it is preferred, if a hole sensor 65 is provided. This sensor may detect holes of the balancing weights and may serve to control the height of slide 55. When a balancing weight is loaded into the tray, preferably slide 55 is at the lowest-possible position. Afterwards, it will be driven upwards until the hole sensor 65 detects the first hole. Then, the movement of slide 55 is stopped, as the balancing weight has reached its final position. In a further embodiment, the hole sensor 65 and the occupancy sensor 66 are combined.

Figure 8:
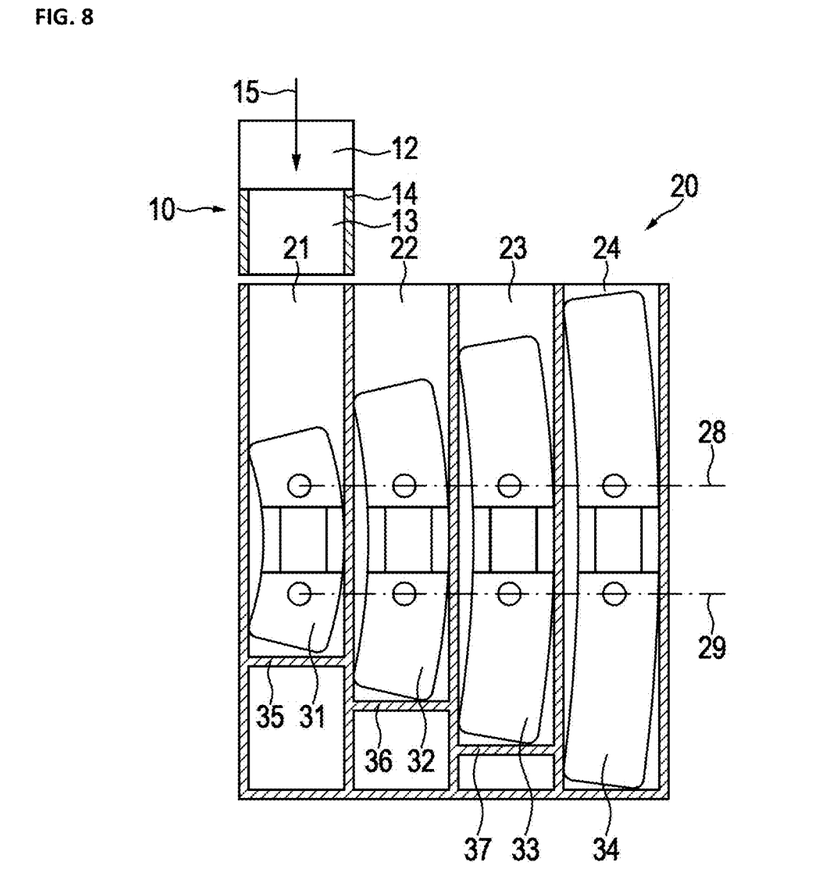
FIG. 8 shows trays with limiting stops.

In FIG. 8, a different tray assembly with exchangeable stops is shown. Herein, stops 35, 36, 37 are inserted into trays 21, 22, 23 for limiting the lengths of the trays. These stops may be fixed by gluing or welding into the trays. In a further embodiment, these stops are removable, and therefore the trays may be adapted in a flexible manner to the individual requirements. The sidewalls 25 may have holes or other means for locating the stops in discrete and predetermined position. This will improve the stability of the stops within the trays and furthermore reduce failures.

Figure 9:
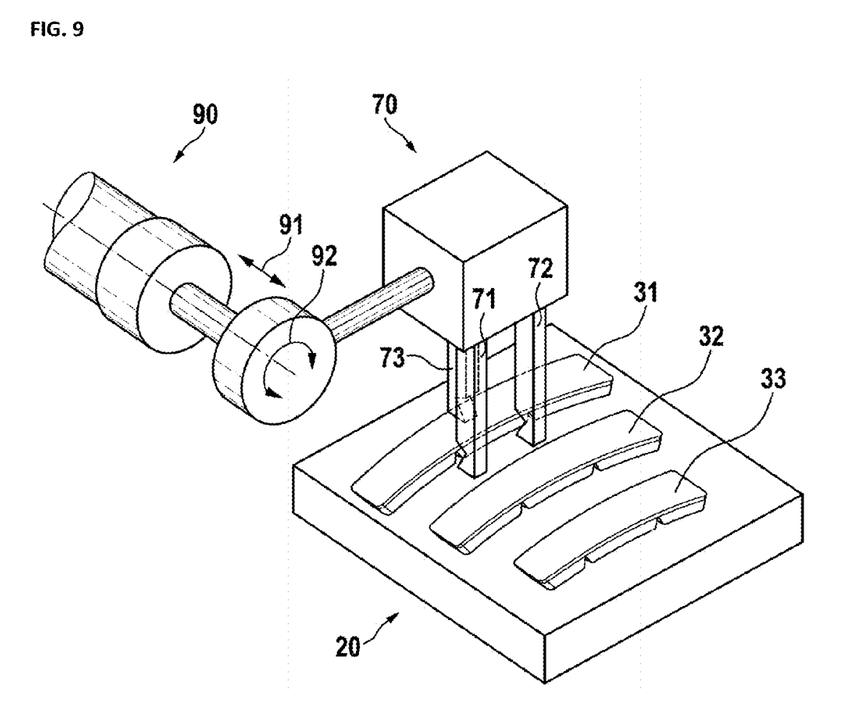
FIG. 9 shows an embodiment of a transfer device.
Figure 10:
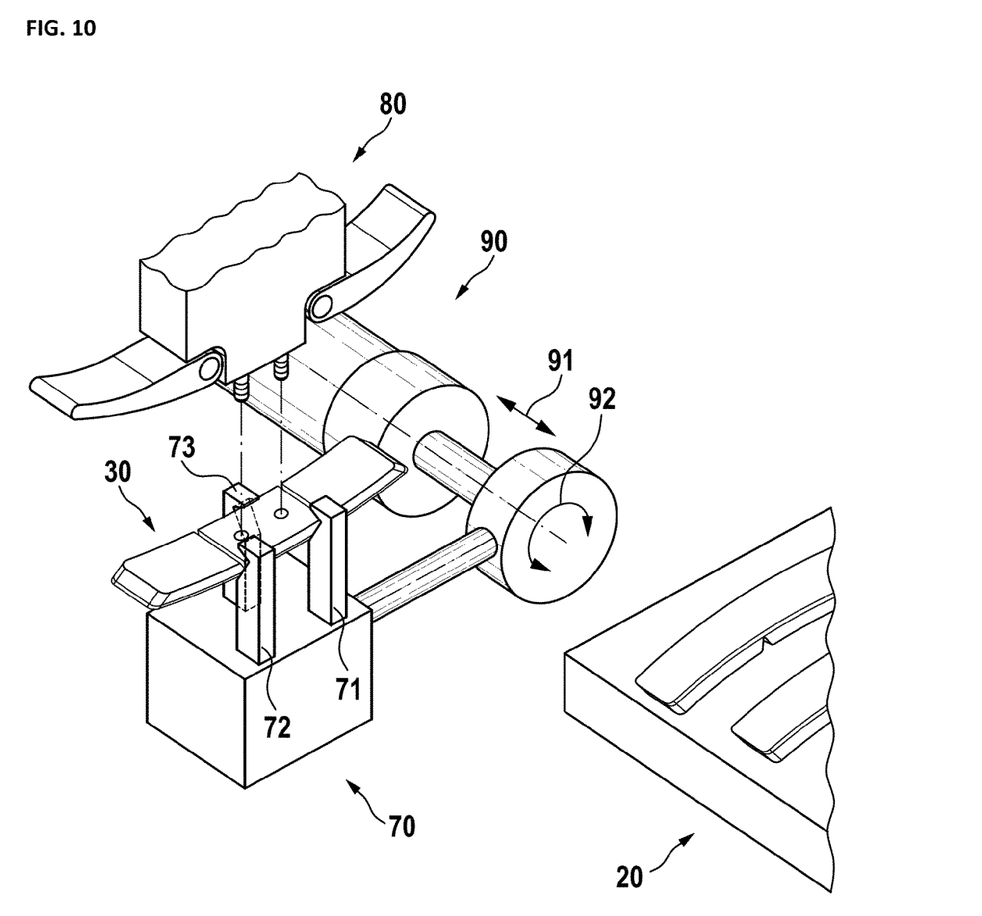
FIG. 10 shows the transfer device in the second position.

In FIG. 9 and FIG. 10, a further embodiment of a transfer device is shown. Here, an actuator 90 is provided together with a transfer head 70 to transfer balancing weights 31, 32, 33 which may be served at a first transfer position on a tray assembly 20, a belt or any other means into a position suitable for picking up the balancing weights, into a second transfer position reachable by an application head 80. In FIG. 9, the transfer head 70 is shown in the first transfer position, while in FIG. 10, it is shown in the second transfer position. The transfer head 70 has means for holding balancing weights like holding pins 71, 72, 73. The means for holding may be adapted to a specific kind of balancing weights like a self-adhesive balancing weights or clip-on balancing weights. There may also be a universal means, which can be adapted or adapt itself to different kinds of balancing weights. Preferably, the means are designed to hold the balancing weight by its sides to prevent contact with a self-adhesive surface. This works also with balancing weights having no self-adhesive surface like clip-on balancing weights. The means may be operated by spring force, electrically, pneumatically or hydraulically. The holding force should be sufficiently high to hold the balancing weight during movement. The transfer head 70 is preferably mounted to an actuator 90 for moving the transfer head between at least two transfer positions. The actuator 90 may provide a linear movement 91 and/or rotational movement 92. An actuator 90 performing only a rotational movement 92 may deliver balancing weights from a constant first transfer position to a second transfer position. In this example, rotation about an angle of 180° is shown. Although this is the preferred rotational angle, smaller or larger angles may also be used. Adding a linear movement 91, would allow to pick up balancing weights at displaced first transfer positions and to deliver the same at a constant second transfer position. By a linear movement 91, a specific balancing weight of a choice of different balancing weights may be selected. This embodiment may be used alone or in conjunction with any of the previous embodiments.

It will be appreciated to those skilled in the art having the benefit of this disclosure that this invention is believed to provide methods and devices for dispensing weights used in vehicle ballasting applications. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 loading section
11 conveyer pulley
12 belt
13 chute
14 sidewall
15 direction of belt
20 tray assembly
21-24 trays
25 sidewall
27 direction of movement
28, 29 height of holes
31-34 balancing weights
35, 36, 37 stops
40 horizontal rotating tray assembly
41 tray
42 tray separator
46 access by handling devices
47 direction of rotation
48 rotation axis
51-54 actuator
55-58 slide
59 push rod
60 ledge
61 actuator
62 sensor
65 hole sensor
66 occupancy sensor
70 transfer head
71, 72, 73 holding pins
80 application head
90 actuator
91 direction of translation
92 direction of rotation

The invention claimed is:

1. Tray assembly for balancing weights, comprising:
a plurality of trays configured to hold balancing weights of different sizes,
wherein at least two of the plurality of trays are sized to receive balancing weights of different sizes such that holes or picking elements of the received balancing weights are disposed at the same height; and
wherein at least one of the plurality of trays has a slide that is movable to adapt the size of the tray to the size of a specific balancing weight.

2. Tray assembly according to claim 1, wherein the tray assembly is moveable relative to a loading device to position and thereby select a specific one of the plurality of trays to receive a balancing weight from the loading device.

3. Tray assembly according to claim 1, wherein the plurality of trays are arranged on a plane and the tray assembly is linearly movable relative to the loading device.

4. Tray assembly according to claim 1, wherein the tray assembly is horizontally rotatable relative to the loading device.

5. Tray assembly according to claim 4, wherein the tray assembly has a conical shape.

6. Tray assembly according to claim 1, wherein the slide is configured to be moved by an actuator.

7. Tray assembly according to claim 1, wherein the slide is configured to be moved manually.

8. Tray assembly according to claim 1, wherein at least one of the trays has a stop that limits the size of the tray.

9. Tray assembly according to claim 1, further comprising a transfer device having a transfer head coupled to an actuator configured to perform a rotational movement.

10. Tray assembly according to claim 9, wherein the transfer head has at least one holding pin.

11. Tray assembly according to claim 9, wherein the actuator is also configured performs a linear movement.

12. Tray assembly for balancing weights, comprising:
a plurality of trays configured to hold balancing weights of different sizes, and
at least one sensor selected from the group consisting of:
a sensor configured to detect the position of a balancing weight in at least one of the plurality of trays;
a hole sensor configured to detect the position of a hole of a balancing weight within at least one of the plurality of trays; and
an occupancy sensor configured to detect the presence of a balancing weight within at least one of the plurality of trays;
wherein at least two of the plurality of trays are sized to receive balancing weights of different sizes such that holes or picking elements of the received balancing weights are disposed at the same height.

13. Tray assembly according to claim 12, wherein the tray assembly is moveable relative to a loading device to position and thereby select a specific one of the plurality of trays to receive a balancing weight from the loading device.

14. Tray assembly according to claim 13, wherein the plurality of trays are arranged on a plane and the tray assembly is linearly movable relative to the loading device.

15. Tray assembly according to claim 13, wherein the tray assembly is horizontally rotatable relative to the loading device.

16. Tray assembly according to claim 13, wherein at least one of the trays has a stop that limits the size of the tray.

17. Tray assembly according to claim 13, further comprising a loading device configured to deliver balancing weights to the plurality of trays.

18. Tray assembly according to claim 17, wherein the loading device includes a ledge that is movable to control delivery of balancing weights into the plurality of trays.

19. Tray assembly for balancing weights, comprising:
a plurality of trays configured to hold balancing weights of different sizes, and
a loading device configured to deliver balancing weights to the plurality of trays, the loading device including a ledge that is movable to control delivery of balancing weights into the plurality of trays;
wherein at least two of the plurality of trays are sized to receive balancing weights of different sizes such that holes or picking elements of the received balancing weights are disposed at the same height.

20. Tray assembly according to claim 19, wherein the tray assembly is moveable relative to a loading device to position and thereby select a specific one of the plurality of trays to receive a balancing weight from the loading device.

21. Tray assembly according to claim 19, wherein the plurality of trays are arranged on a plane and the tray assembly is linearly movable relative to the loading device.

22. Tray assembly according to claim 19, wherein the tray assembly is horizontally rotatable relative to the loading device.

23. Tray assembly according to claim 19, wherein at least one of the trays has a stop that limits the size of the tray.

24. Tray assembly according to claim 19, further comprising a transfer device having a transfer head coupled to an actuator configured to perform a rotational movement.

25. Tray assembly according to claim 24, wherein the transfer head has at least one holding pin.

26. Tray assembly according to claim 24, wherein the actuator is also configured performs a linear movement.

* * * * *